(12) United States Patent
Jaeger et al.

(10) Patent No.: US 9,019,154 B2
(45) Date of Patent: Apr. 28, 2015

(54) RADAR CIRCUIT, RADAR SYSTEM AND METHOD FOR TESTING

(75) Inventors: Herbert Jaeger, Linz (AT); Christoph Wagner, Enns (AT)

(73) Assignee: Infineon Technologies AG, Neubiberg (DE)

( * ) Notice: Subject to any disclaimer, the term of this patent is extended or adjusted under 35 U.S.C. 154(b) by 542 days.

(21) Appl. No.: 13/352,304

(22) Filed: Jan. 17, 2012

(65) Prior Publication Data
US 2013/0082869 A1 Apr. 4, 2013

(30) Foreign Application Priority Data
Sep. 29, 2011 (DE) .......................... 10 2011 115 309

(51) Int. Cl.
*G01S 7/40* (2006.01)
*H01Q 1/32* (2006.01)

(52) U.S. Cl.
CPC ................ *G01S 7/4052* (2013.01); *H01Q 1/32* (2013.01); *G01S 2007/406* (2013.01)

(58) Field of Classification Search
CPC ... G01S 7/4021; G01S 7/4004; G01S 7/4008; G01S 7/4017; G01S 7/4026; G01S 7/40
USPC .................................................. 342/173–174
See application file for complete search history.

(56) References Cited

U.S. PATENT DOCUMENTS

| 4,052,722 | A | * | 10/1977 | Millard ........................... 342/115 |
| 4,231,039 | A | * | 10/1980 | Fritzlen et al. ................. 342/116 |
| 4,806,935 | A | * | 2/1989 | Fosket et al. .................. 342/120 |
| 5,691,724 | A | * | 11/1997 | Aker et al. ..................... 342/104 |
| 6,097,332 | A | * | 8/2000 | Crosby, II ........................ 342/72 |
| 6,437,577 | B1 | | 8/2002 | Fritzmann et al. |
| 6,798,374 | B1 | * | 9/2004 | Smith ........................... 342/109 |
| 6,928,281 | B2 | | 8/2005 | Ward et al. |
| 7,161,530 | B2 | * | 1/2007 | Christian et al. ............. 342/174 |
| 7,439,909 | B2 | | 10/2008 | Van Toorenburg |
| 7,672,647 | B2 | * | 3/2010 | Forstner et al. ............... 455/121 |
| 7,777,610 | B2 | * | 8/2010 | O'Toole et al. .............. 340/10.4 |
| RE42,316 | E | * | 5/2011 | Vacanti ......................... 342/173 |
| 8,451,165 | B2 | * | 5/2013 | Puzella et al. .................. 342/70 |
| 8,854,264 | B2 | * | 10/2014 | Feger et al. ............ 343/700 MS |
| 8,860,606 | B2 | * | 10/2014 | Himmelstoss et al. ....... 342/159 |
| 2005/0088336 | A1 | * | 4/2005 | Sakamoto et al. ............ 342/175 |

(Continued)

FOREIGN PATENT DOCUMENTS

CN 1898578 A 1/2007
CN 102013927 A 4/2011

(Continued)

OTHER PUBLICATIONS

Office Action in related application from the GPO, Application-No. 10 2011 115 309.1, received on Mar. 5, 2012.

*Primary Examiner* — John B Sotomayor
(74) *Attorney, Agent, or Firm* — SpryIP, LLC

(57) ABSTRACT

A radar circuit for controlling a radar antenna in a vehicle comprises an antenna connection for connection of a radar antenna, a transmitting and receiving circuit for transmission and reception of a radar signal, wherein the transmitting and receiving circuit is connected to the antenna connection. A test circuit is provided, wherein the test circuit is likewise connected to the antenna circuit, and the test circuit is designed to use a test signal to test whether a radar antenna is functionally correct connected.

19 Claims, 8 Drawing Sheets

(56) References Cited

U.S. PATENT DOCUMENTS

| | | |
|---|---|---|
| 2005/0190101 A1* | 9/2005 | Hiramatsu et al. ............ 342/175 |
| 2006/0132350 A1* | 6/2006 | Boltovets et al. ............... 342/70 |
| 2006/0238414 A1* | 10/2006 | Miyamoto et al. ............ 342/351 |
| 2008/0180313 A1 | 7/2008 | Ikeda et al. |
| 2009/0051591 A1 | 2/2009 | Nakajima et al. |
| 2011/0319034 A1* | 12/2011 | Boe et al. ................... 455/67.14 |

FOREIGN PATENT DOCUMENTS

| | | |
|---|---|---|
| EP | 2762913 A1 * | 8/2014 |
| EP | 2600520 B1 * | 9/2014 |
| WO | 2011001206 A1 | 1/2011 |

* cited by examiner

RADAR CIRCUIT, RADAR SYSTEM AND METHOD FOR TESTING

REFERENCE TO RELATED APPLICATIONS

This application claims the benefit of the priority date of German application 102011115309.1 filed on Sep. 29, 2011 the content of which is herein incorporated by reference.

BACKGROUND

Radar systems are nowadays being increasingly used in vehicles of all categories and types. By way of example, the provision of radar systems makes it possible to identify potential hazards which are caused by, for example, other vehicles, pedestrians or other obstructions. The use of radar systems can help to identify such obstructions, and to provide suitable measures against a collision. Measures such as these comprise, for example, the production of a warning signal, which is emitted to the driver depending on a distance or the change in a distance to an object or person. Furthermore, it is also possible to produce a control signal in order to reduce or adapt a speed of the vehicle, or to initiate an evasive maneuver.

Radar systems are therefore used for improved road safety for vehicles, and this will also become increasingly important in the future, because of legal regulations in some countries.

In this case, radar systems cannot only be used in land vehicles but can likewise be used in other vehicle types, such as watercraft etc., in order to identify objects and to avoid collisions.

SUMMARY

According to one aspect a radar circuit for controlling a radar antenna in a vehicle has an antenna connection for connection of a radar antenna, a transmitting and receiving circuit for transmission and/or reception of a radar signal, wherein the transmitting and receiving circuit is connected to the antenna connection. A test circuit is provided, wherein the test circuit is likewise connected to the antenna connection, and the test circuit is designed to use a test signal to test whether a radar antenna is functionally correct connected. The radar circuit is integrated together with the test circuit in one semiconductor chip, in a number of exemplary embodiments.

In a further aspect a radar system for a vehicle has a mount on which a radar circuit and a radar antenna are arranged. The radar circuit has an antenna connection for connection of a radar antenna, a transmitting and receiving circuit for transmission and reception of a radar signal, and a matching circuit which is connected to the transmitting and receiving circuit and to the antenna connection. Furthermore, the radar circuit has a test circuit, wherein the test circuit is connected to the matching circuit. The test circuit of the radar circuit is designed to use a test signal to test whether the radar antenna is connected.

DETAILED DESCRIPTION

A number of exemplary embodiments will be described in the following text, wherein the same elements or elements of the same type in the various exemplary embodiments can each be provided with the same reference symbols.

One exemplary embodiment of a radar circuit 100 for use in a vehicle, such as a motorized motor vehicle, will now be described with reference to FIG. 1. In an number of exemplary embodiments, the entire radar circuit 100 can be implemented by one or more semiconductor modules. The radar circuit 100 has an antenna connection 102 for connection to an antenna (not shown in FIG. 1). Furthermore, the radar circuit has a transmitting/receiving circuit 104, which is connected to the antenna connection 102, in order to transmit a radar signal, which is produced by the transmitting/receiving circuit 104, on a radar signal path via the antenna connection 102 and an antenna feedline 110 to the radar antenna, and to supply a signal which is received by the radar antenna to the transmitting/receiving circuit 104 via the antenna feedline 110 and the antenna connection 102.

Figure 1:
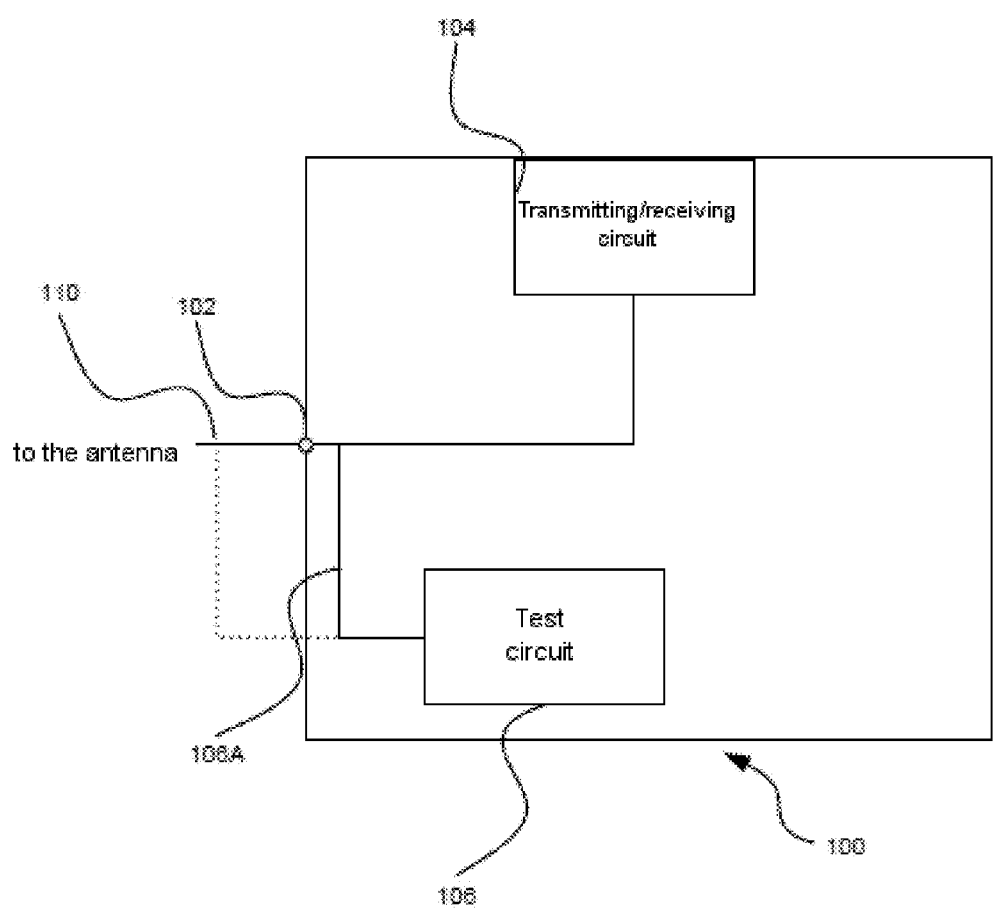
FIG. 1 shows a block diagram of a radar circuit according to one exemplary embodiment.

Although the block diagram in FIG. 1 shows the antenna connection 102 as only a single element, a person skilled in the art will understand that the antenna connection 102 can represent a plurality of connecting areas, in a number of embodiments. By way of example, a plurality of connecting areas can be provided in the radar circuit 100, in order to provide an electrical connection for connection to the antenna. The connecting areas may, for example, be areas for attachment of connecting wires to the antenna feedline 110, or directly to an antenna. By way of example, the connection can be produced by attachment by bonding, flip-chip technology, surface mount techniques, etc. By way of example, the connecting areas may be a ball grid array or connecting areas which are used for other attachment techniques. The connecting connection may in this case be formed by soldered balls or bonding wires.

Furthermore, a plurality of connecting areas may also be provided, in order to pass through an electrical connection to a plurality of feedlines or a plurality of antenna elements.

As will be stated later, the antenna may be a planar antenna which is integrated on a mount, for example a printed circuit board. By way of example, the antenna may have one or more patch antennas.

The transmitting/receiving circuit 104 can be implemented by known techniques for production of radar signals for vehicles. In a number of exemplary embodiments, the frequency of the radar signals which are produced may, for example, be 24 or 77 GHz, although it should be understood that any other frequency in the radar range can be used. In a number of embodiments, the transmitting/receiving circuit 104 may be a pure transmitting circuit, a pure receiving circuit or a circuit for transmission and reception of radar signals.

The transmitting/receiving circuit 104 may have known evaluation circuits, in order to allow appropriate distance calculation or differential speed calculations to be carried out. Appropriate information can be emitted to a control unit or to a user of the vehicle, on the basis of these calculations.

As can be seen from FIG. 1, the radar circuit 100 also has a test circuit 106, which is connected to the antenna connection 102. The test circuit 106 is coupled to the antenna at least partially via a test connecting line 106A, which is coupled to the radar signal path at a circuit branch. As will be explained in the following text, in a number of exemplary embodiments, the test circuit 106 can furthermore have a second connection to the signal path, thus forming a closed electrical loop in which the test signal is carried.

In a number of exemplary embodiments, the test connecting line 106A is an electrically conductive connecting path in which no radar signals are carried. In a number of exemplary embodiments, a suitable branching element such as a filter structure, a matching element which is specifically modified for feeding in the test signal and is integrated in the radar signal path in the radar circuit, or a bias-tee etc. can be used to prevent radar signals from being able to enter the test connecting line 106A and the radar signal path being disturbed by the test connecting line 106A. The test connecting line 106A is suitable for carrying an electrical DC voltage or direct-current signal, or a low-frequency test signal.

The test circuit 106 can also be coupled to the antenna outside the radar circuit, for example directly at the radar antenna, as is shown by dotted lines in FIG. 1. By way of example, in one exemplary embodiment, a ground connection which is provided at the antenna can represent the circuit branch which is used to introduce the test signal.

The test circuit 106 is designed and makes it possible to produce the test signal and furthermore to feed in a test signal in order to identify whether the antenna is functionally correct connected. In order to produce the test signal, the test circuit 106 may have a DC voltage source or a direct-current source, wherein the process of feeding in the test signal can be controlled via a switch, for example a transistor. Furthermore, in a number of exemplary embodiments, the test circuit 106 may also have a signal generator, in order to produce a low-frequency electrical signal. In further exemplary embodiments, the test signal may also be a radio-frequency signal. The signal waveform may be a signal at a constant frequency or a signal at varying frequencies. By way of example, the signal generator can produce a regular sine-wave signal or a regular square-wave signal. However, it is also possible to use other signals with a predetermined frequency spectrum.

Figure 8:
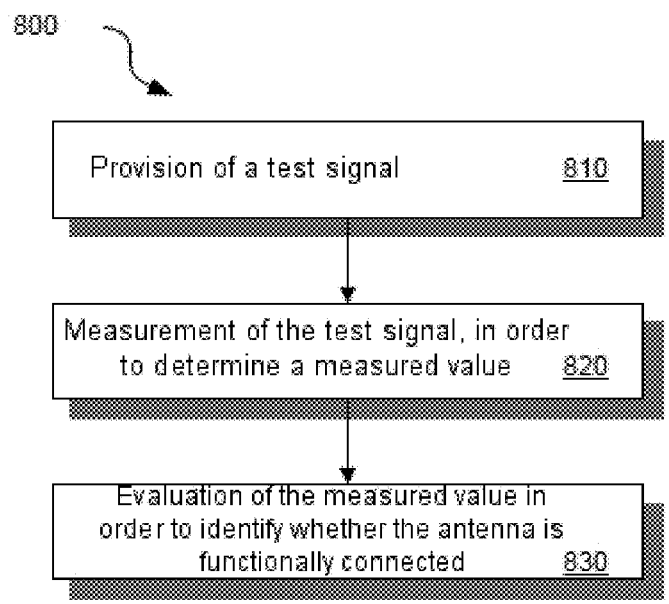
FIG. 8 shows a flowchart according to one exemplary embodiment.

FIG. 8 shows a flowchart 800 for carrying out tests by means of the radar circuit 100. In a first step 810, a test signal is provided, as has already been described above. In a step 820, the test signal is measured, in order to determine a measured value. By way of example, the measured value may be a voltage, current or impedance based on the test signal. In a further step, the measured value is evaluated in order to identify whether the antenna is functionally correct connected.

By way of example, the signal strength of the test signal fed back can be used as the basis for deciding whether the antenna is incorrectly connected, in order to identify the functional connection. For this purpose, it is either possible to use a parameter of the received test signal itself, for example a maximum value or a mean value of a voltage, of a current or of a power of the test signal, or else it is possible to determine a parameter such as a resistance or an impedance based on the received test signal. If it is found that these values are outside a predetermined or predefined range, the test circuit 106 outputs a signal which indicates that an incorrect antenna connection has been found. By way of example, the signal can be used in a control unit to produce a warning indication to the driver, or to switch off control systems which are based on the radar signal in order, for example, to prevent accidents which may be caused by an antenna which is no longer functionally connected.

A connection which is no longer functional correct may be caused, for example, by excessive mechanical loading occurring within vehicles in the cause of the operating times. This can lead to incorrect electrical connections in the antenna connection 102 or in the feedlines to the antenna, for example micro strips which are routed on a printed circuit board, as a result of which the antenna is no longer correctly connected. Furthermore, aging phenomena, reduced-quality material, accidents or other factors may be responsible for an antenna connection which was functional when the vehicle was first used no longer being functional over the course of many years of operation.

The radar circuit described above makes it possible to carry out a test at any time, for example during the production of the radar system, directly after production or else during operation, that is to say even while radar signals are being passed to or received from the antenna, without disturbing radar operation.

As already described above, both a direct current or DC voltage test signal or a low-frequency test signal can be used for testing. In a number of exemplary embodiments, these can also be combined in order to achieve improved safety with respect to the presence of a non-functional connection. The production of the test signals can be controlled by a control unit, for example in order to produce test signals at regular intervals or depending on the operating time of the vehicle.

Various embodiments will now be described with respect to the implementation of the radar circuit 100 in a radar system having an antenna, and the various possibly ways to feed the test signal in, with reference to the following figures.

FIGS. 2 to 5 relate to different embodiments in which the test signal is fed into a closed loop from the test arrangement.

In these arrangements, the circuit, which is located externally with respect to the radar circuit, that is to say by way of example the antenna itself or the feedlines for the antenna, has a connection for an additional electrically conductive path, in order to feed back the test signal to the test circuit 106, and thus to close the closed loop.

Figure 2:
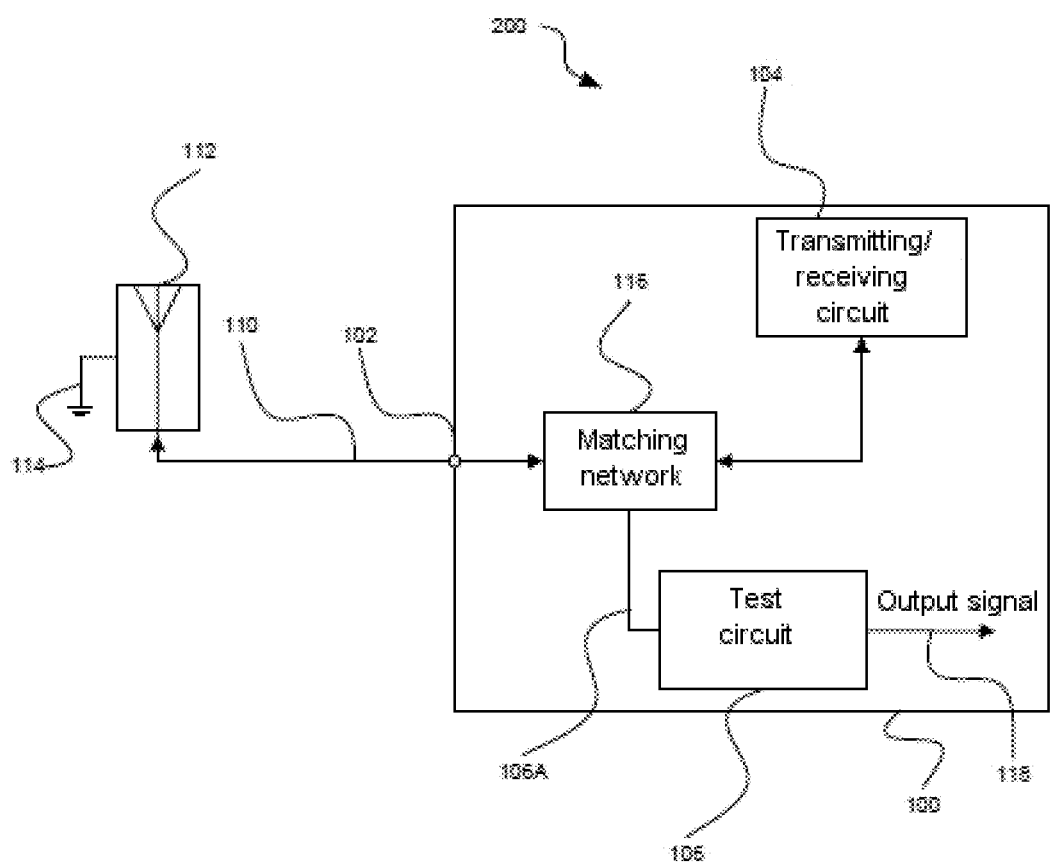
FIG. 2 shows a block diagram of a radar system having an antenna according to one exemplary embodiment.

FIG. 2 shows an embodiment of a radar system 200 in which a connection 114 of an antenna 112 is used to form a closed loop. By way of example, the connection may be a connection which is intended for a ground connection of the antenna 112, wherein the same can be coupled, for example via filter structures, to the radar signal path in order to prevent the radar signals from being injected into the connection 114, and therefore influencing the radar signal. The antenna 112 may be a planar antenna which, for example, is fitted as a metallic pattern to a printed circuit board. The radar circuit 100 which, for example, is implemented as a semiconductor module may be connected to corresponding connecting areas on the printed circuit board, such that the radar circuit 100 is connected to the antenna 112.

The radar system 200 has an embodiment of the radar circuit 100 as has already been described with reference to FIG. 1. The radar circuit 100 has a matching element or matching circuit 116 in the radar signal path between the transmitting/receiving circuit 104 and the antenna connection 102, in order to match the impedance to that of the connected antenna 112. By way of example, the matching element 116 may comprise a matching network, or other known matching systems. The test circuit 106 is connected via the test connecting circuit 106A to an input of the matching element 116, in order to pass a test signal via the matching element 116 to the connection 114 of the antenna 112. In contrast to known matching elements, the matching element 116 is modified such that a direct current or a DC voltage or a low-frequency test signal can be fed into the radar signal path without significantly disturbing the radar signal path. For this purpose, the matching element 116 may, for example, have a node which is provided with a filter structure in order to prevent the possibility of radar signals entering the test connecting line 106A.

After being fed into the matching element 116 in the radar signal path, the test signal is fed back via the antenna feedline 110 to the connection 114 and via ground, thus forming a closed loop for the test signal. For example by measuring current and voltage values of the test signals in the closed loop, the test circuit 106 determines a test result signal, which is output as the output signal 118 from the test circuit 106 and, for example, is passed to a control unit. By way of example, the output signal 118 may be a digital signal which determines whether or not the test was successful. In other words, the output signal outputs information as to whether the antenna 112 is or is not functionally correct connected to the radar circuit.

The radar system described with reference to FIG. 2 can therefore carry out a test without having to provide additional external connections in the radar circuit. Modifications are admittedly required to the matching element for this purpose, but these can be made available with relatively little design effort. Since additional connections for the production and the housing of integrated semiconductor circuits always represent an additional cost factor, the avoidance of a further connection therefore makes it possible to achieve a cost-effective implementation of a radar system on the basis of integrated semiconductor circuits.

A further exemplary embodiment of a radar system 200 will now be described with reference to FIG. 3.

Figure 3:
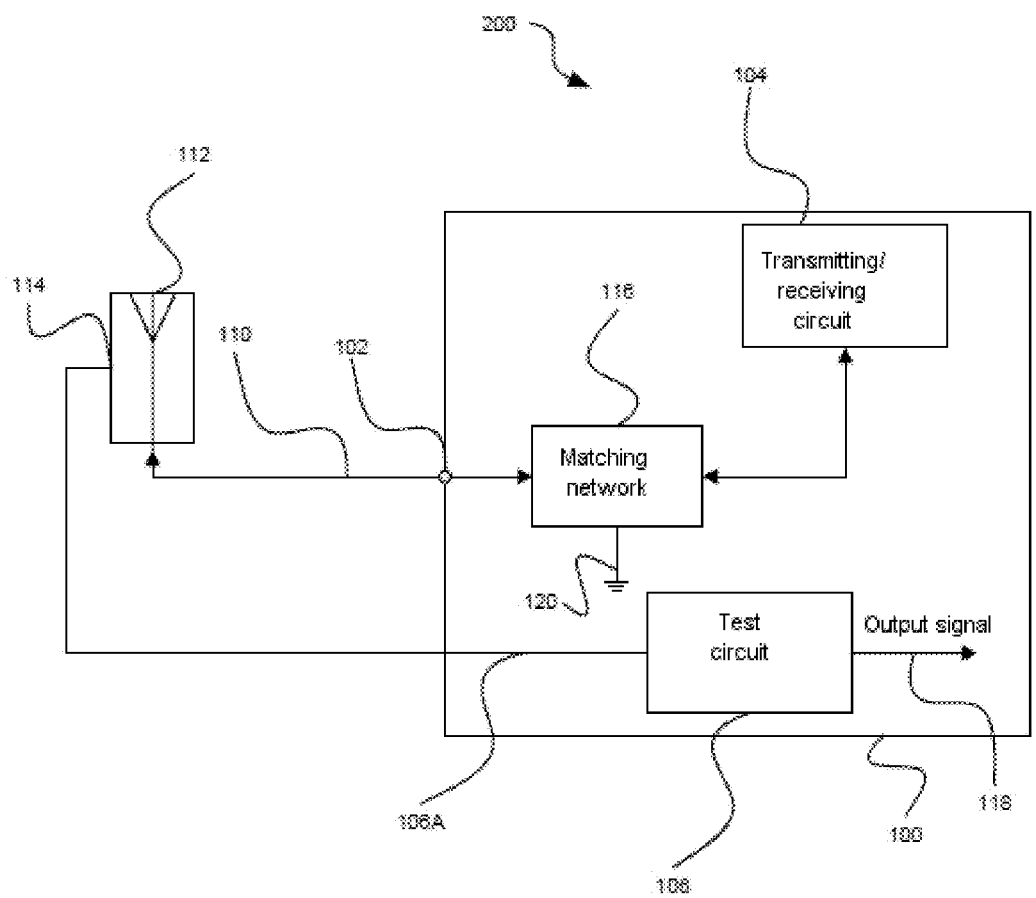
FIG. 3 shows a block diagram of a radar system having an antenna according to one exemplary embodiment.

As shown in FIG. 3 and in contrast to the radar system shown in FIG. 2, the radar system 200 has a connection of the test circuit 106 via the test connecting line 106A to the connection 114 of the antenna 112. Furthermore, the matching element 116 is connected to a ground connection 120, thus once again forming a closed loop. Since the matching element typically has ground connections, this implementation does not require any modification to the matching element, since the existing ground connections can be used. However, an additional external connection is required, in order to pass the test connecting line 106A to the exterior.

One exemplary embodiment of a radar system in which a closed test signal loop is formed without using a ground connection will now be described with reference to FIG. 4.

Figure 4:
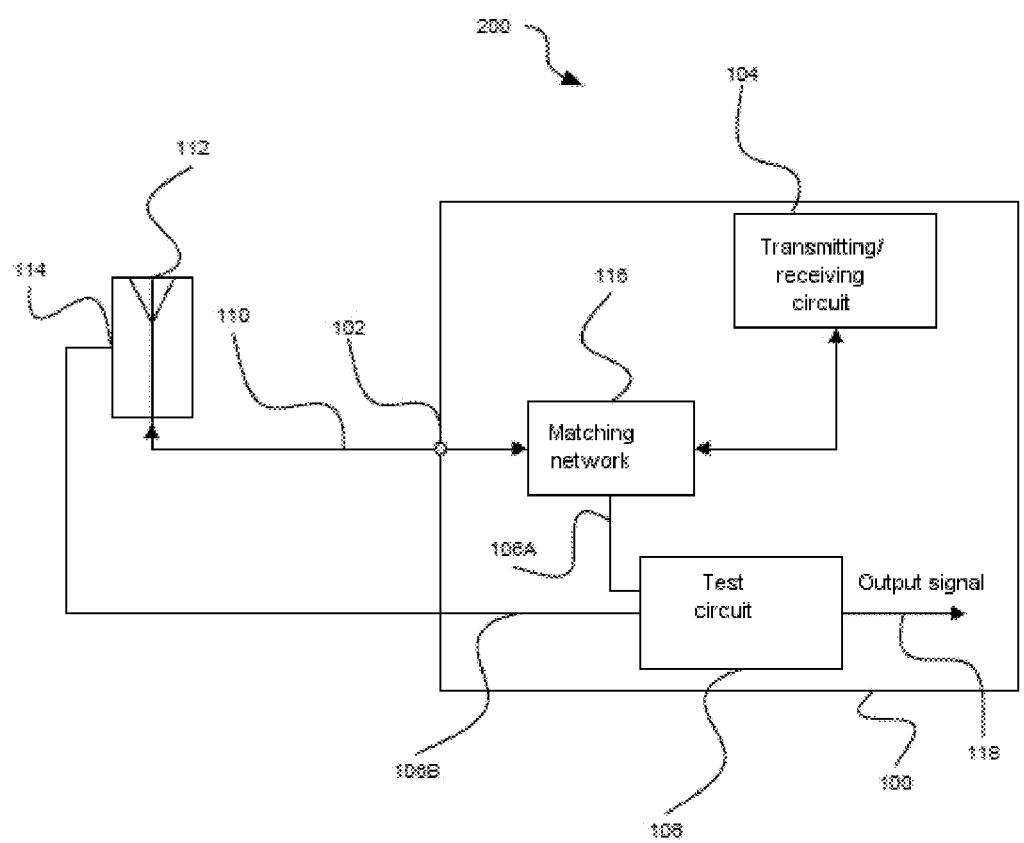
FIG. 4 shows a block diagram of a radar system having an antenna according to one exemplary embodiment.

In the radar system 220 shown in FIG. 4, a further test connecting line 106B is provided in addition to the test connecting line 106A. As has already been explained with reference to FIG. 2, the test connecting line 106A connects the test circuit 106 to the matching element 116. As explained above, the matching element 116 is appropriately adapted for feeding in the test signal. Furthermore, the further test connecting line 106B is connected to the external connection 114 of the antenna 112. This forms a closed loop without using a ground connection for carrying the test signal. Since the test signal is carried without a ground connection, the test circuit 106 can in a number of exemplary embodiments be designed appropriately to identify a ground short in the radar signal path, by identifying a test signal component flowing away via ground. This allows improved safety to be achieved with respect to the functionality of the radar system, since the additional fault source of a ground short can be identified.

A further exemplary embodiment of a radar system 200 will now be described with reference to FIG. 5.

Figure 5:
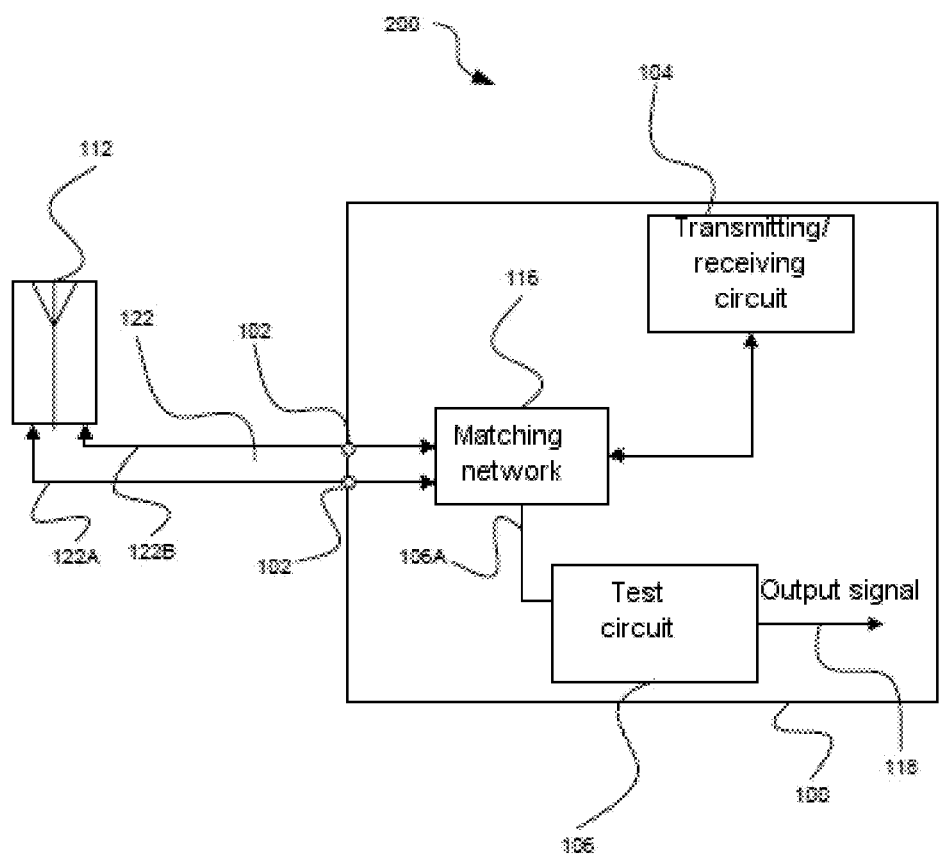
FIG. 5 shows a block diagram of a radar system having an antenna according to one exemplary embodiment.

In order to carry the radar signals between the matching element 116 and the antenna 112, the radar system 200 shown in FIG. 5 has a differential signal path, that is to say a differential antenna feedline 122 having two conductors 122A and 122B is provided, connecting the antenna 112 to the matching element 116. In this exemplary embodiment, the test circuit 106 is connected via the test connecting line 106A to the matching element 116. One of the two differential conductors is used to carry the test signal to the antenna 112. The other of the two differential conductors is used to feed back the test signal to the matching element 116 again. In other words, the two differential conductors are used to form a closed loop for the test signal. This makes it possible to avoid the need for additional conductors for the closed loop. The connection of the test circuit 106 to the matching element 116 in this case makes it possible to feed the test signal into the test circuit 106 via appropriate branching points in the matching element 116.

A further exemplary embodiment of a radar system 200 will now be described with reference to FIG. 6.

Figure 6:
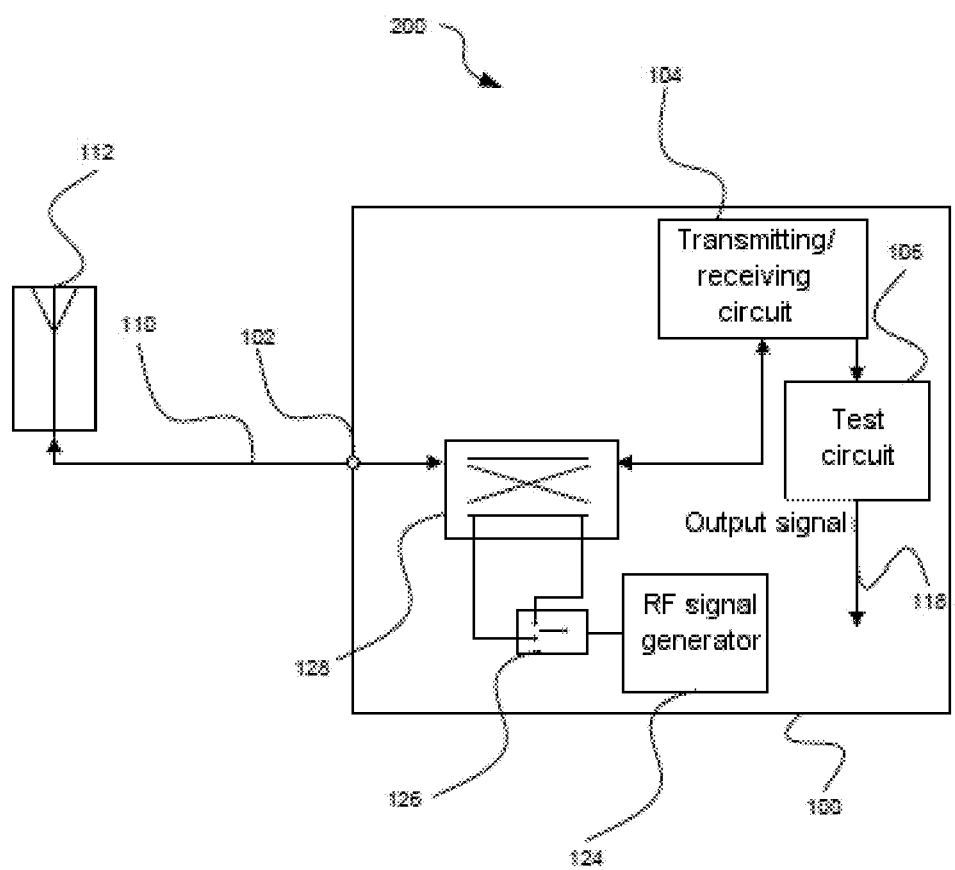
FIG. 6 shows a block diagram of a radar system having an antenna according to one exemplary embodiment.

In the exemplary embodiment described in FIG. 6, a radar test signal is fed into the radar signal path and the radar test signal is used as the basis to determine whether the antenna 112 is functionally correct connected. In a number of exemplary embodiments, the reflected power of the signal fed in is measured for this purpose. A radio-frequency signal generator 124 is provided in the test circuit 106, in order to produce the radar test signal. The test circuit 106 is connected via a switch 126 to in each case two connections of a coupler element 128, which is arranged in the radar signal path between the antenna 112 and the transmitting/receiving circuit 104, in order to feed the test signal which is produced by the test circuit 106 into the radar signal path in a forward direction or in a return direction, via the coupler element 128, depending on the switch position. By way of example, the coupler element 128 may be formed by means of directional couplers which allow signals to be output or input depending on the direction. The receiving stage in the transmitting/receiving circuit 104 measures the reflected test signal and uses this to determine parameters by means of which the operation of the antenna 112 can be checked. Such parameters may be the signal level, or the signal frequency. Further parameters such as a mean signal level, peak values, zero crossings and so on, can likewise be determined, for example. In this case, use is made of the fact that, in the case of a connection of the antenna 112 which is no longer functional, the complex impedance for the test signal changes, thus leading to a change in the reflection factor, which can be detected by monitoring the reflected signal. Test signals can be injected in the forward or return direction via the coupler element 128. It is possible to form the ratio between the test signals which are fed in in the forward direction and the return direction. The evaluation of a ratio such as this enhances the robustness and reliability of the measurement and of the evaluation since the ratio formation process eliminates parameters such as the output level of the signal generator 124 or the sensitivity of the receiver, or of the transmitting/receiving circuit 104, from the measurement. The measurements can be evaluated by a circuit which is designed for this purpose, or the evaluation can be carried out by suitable software in the radar circuit 100, per se.

It should be noted that the additional coupling element 128 and the outputting of the signals also increase the power loss in the radar signal path.

Figure 7:
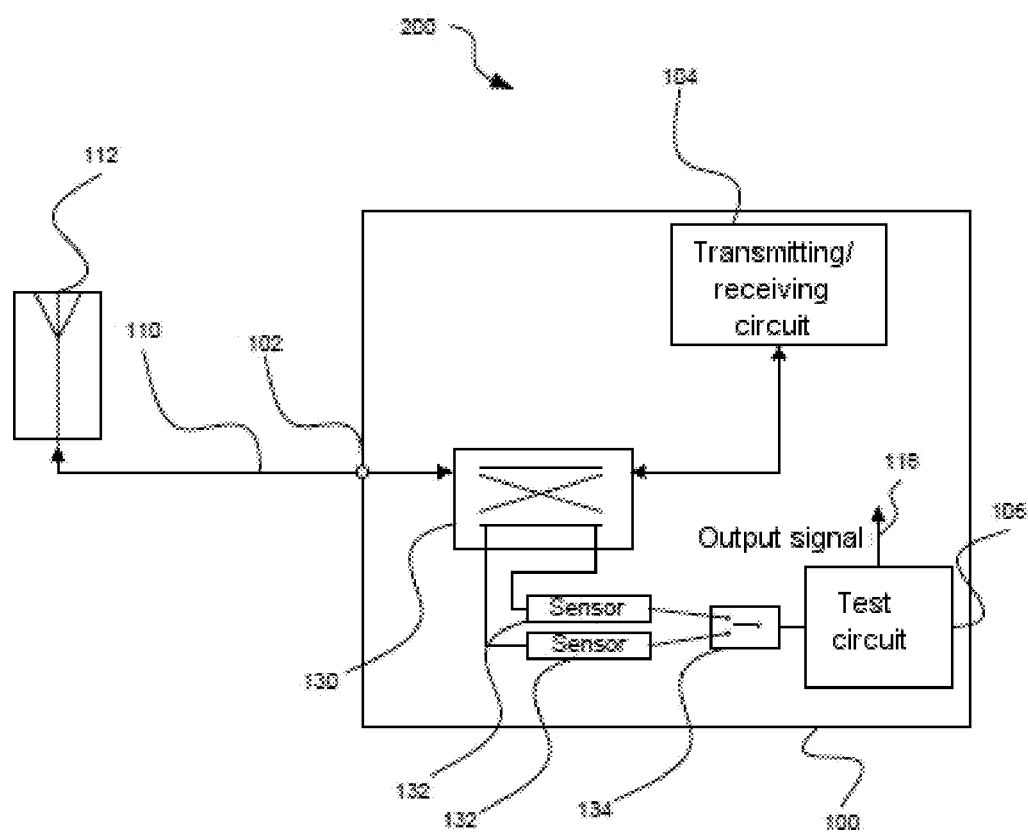
FIG. 7 shows a block diagram of a radar system having an antenna according to one exemplary embodiment.

A further exemplary embodiment will be described in the following text with reference to FIG. 7.

In this exemplary embodiment, respective signal sensors are used to measure at least one parameter of the radar signals transmitted by the transmitting/receiving unit, in the forward direction and in the return direction, and then to supply this to the test circuit 106. By way of example, the parameter may be a mean value or a maximum value of the power. The test circuit 106 then uses the measured values to determine whether or not a functional antenna connection is present. As shown in FIG. 7, the radar system 200 has a coupling element 130 which is connected between the transmitting/receiving unit 104 and the antenna 112. A part of the radar signal in the forward direction and a part of the signal in the return direction are output at in each case one of two outputs of the coupling element 130 and are each fed to a sensor element 132, to measure a respective parameter. In one exemplary embodiment, the sensor elements 132 are, for example, sensors for determination of a power of the output signals. The sensor elements are coupled to a switch 134 in order to feed the respective measurement signals selectively to the test circuit 106. On the basis of the measurement by the sensor element 232, the test circuit 106 determines whether the antenna 112 is functionally correct connected. This can be done, for example, by calculating a reflection factor by forming the quotient of the two measurement signals, and by comparing this quotient with a predetermined value.

Various embodiments and concepts for implementation of testing of the functional connection of a radar antenna have been described in the exemplary embodiments described above. It is to be understood that each of these different implementations can be combined with any other described implementation in order, for example, to improve safety, or for other reasons. Therefore, any feature which has been described or illustrated in one of the various exemplary embodiments can be combined with any other exemplary embodiment.

The invention claimed is:

1. A radar circuit for controlling a radar antenna in a vehicle comprising:
   an antenna connection for connection of a radar antenna,
   a transmitting and receiving circuit for transmission and/or reception of a radar signal, wherein the transmitting and receiving circuit is connected to the antenna connection
   a test circuit, wherein the test circuit is connected to the antenna connection,
   wherein
   the test circuit is operable to transmit a test signal to an antenna and to receive a returned test signal from the antenna, wherein the test signal and the returned test signal are at least one of a direct current signal or a DC voltage signal or a low frequency signal having a frequency lower than the frequency of the radar signal by a factor of at least $10^4$, wherein the test circuit is further configured to detect whether the radar antenna is functionally correct connected based on an evaluation of the returned test signal, and wherein the test circuit is capable to transmit the test signal to the radar antenna during a radar transmission and/or reception of the radar signal such that the transmission and/or reception of the radar signal is not disturbed by the test signal and the returned test signal.

2. The radar circuit as claimed in claim 1,
   having a matching circuit, wherein the transmitting and receiving circuit and test circuit are connected to the antenna connection via the matching circuit.

3. The radar circuit as claimed in claim 1,
   wherein the radar circuit has a connection for connection of a reference potential which is the same as that of the radar antenna.

4. The radar circuit as claimed in claim 1,
   wherein the radar circuit has a connection for connection of a connection of the radar antenna for the test signal.

5. The radar circuit as claimed in claim 1,
   wherein the antenna connection of the radar circuit is designed such that the antenna connection can be connected by bonding wires to the radar antenna.

6. The radar circuit as claimed in claim 1,
   wherein the antenna connection of the radar circuit is designed such that the antenna connection can be connected by solder balls to the radar antenna.

7. The radar circuit as claimed in claim 1,
   wherein the radar circuit is mounted in a housing.

8. The radar circuit according to claim 1, wherein the transmitting and receiving circuit and the test circuit are integrated on a same semiconductor integrated circuit.

9. A radar system for a vehicle comprising:
   a mount, wherein a radar circuit and a radar antenna are arranged on the mount,
   the radar circuit has an antenna connection for connection of a radar antenna,
   a transmitting and receiving circuit for transmission and/or reception of a radar signal,
   a matching circuit, wherein the matching circuit is connected to the transmitting and receiving circuit and to the antenna connection, and
   a test circuit, wherein the test circuit is connected to the matching circuit to form during a test a closed test loop between the test circuit and the antenna, and
   the test circuit of the radar circuit is operated to transmit a test signal in the closed test loop to the antenna to test whether the radar antenna is functionally correct connected based on a returned test signal from the antenna, wherein the test signal is a direct current or a DC voltage signal or a low frequency signal having a frequency lower than a frequency of the radar signal by at least $10^4$.

10. The radar system for a vehicle as claimed in claim 9,
    wherein the radar circuit is connected by bonding wires to the radar antenna.

11. The radar system for a vehicle as claimed in claim 9,
    wherein the radar circuit is connected by solder balls to the radar antenna.

12. The radar system for a vehicle as claimed in claim 9,
    wherein the radar antenna has at least one patch antenna.

13. The radar system for a vehicle as claimed in claim 9,
    wherein the radar circuit is mounted in a housing.

14. The radar system for a vehicle as claimed in claim 9,
    wherein the radar circuit is mounted on the mount without a housing.

15. The radar system for a vehicle as claimed in claim 9,
    wherein the radar circuit and the radar antenna have a connection for a common reference potential.

16. The radar system for a vehicle as claimed in one of claim 9,
    wherein the radar circuit and the radar antenna each have a connection for the test signal.

17. A method for testing the operation of a connection between a radar circuit and a radar antenna in a vehicle, for use in a radar system, the method comprising:
    provision of a test signal, wherein the test signal is a direct current or a DC voltage signal or a low frequency signal having a frequency lower than a frequency of the radar signal by at least $10^4$, measurement of a returned test signal which is returned from the antenna in a closed loop, in order to produce at least one measured value; and evaluation of the measured value, in order to identify whether the radar antenna is functionally correct connected.

18. The method according to claim 17, wherein the evaluation of the measured value includes an evaluation of a reflection factor.

19. The method according to claim 17, wherein the evaluation of the measured value includes an evaluation of an impedance.

* * * * *